Nov. 3, 1964  C. E. JOHANSON  3,154,944
SENSING FLIGHT CONDITIONS
Filed April 15, 1960  3 Sheets-Sheet 1
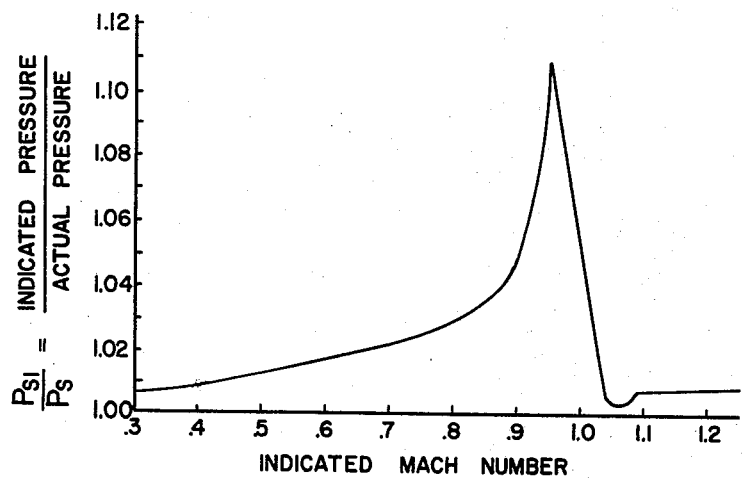
FIG. I
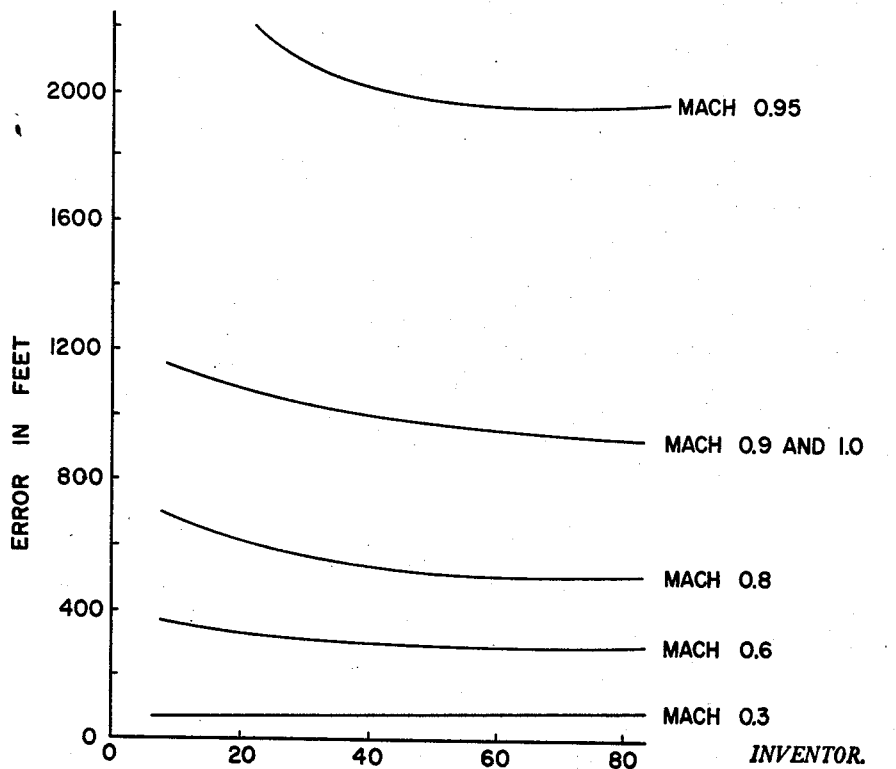
FIG. II
INVENTOR.
CARL E. JOHANSON
BY
ATTORNEY Nov. 3, 1964 C. E. JOHANSON 3,154,944
SENSING FLIGHT CONDITIONS
Filed April 15, 1960 3 Sheets-Sheet 2
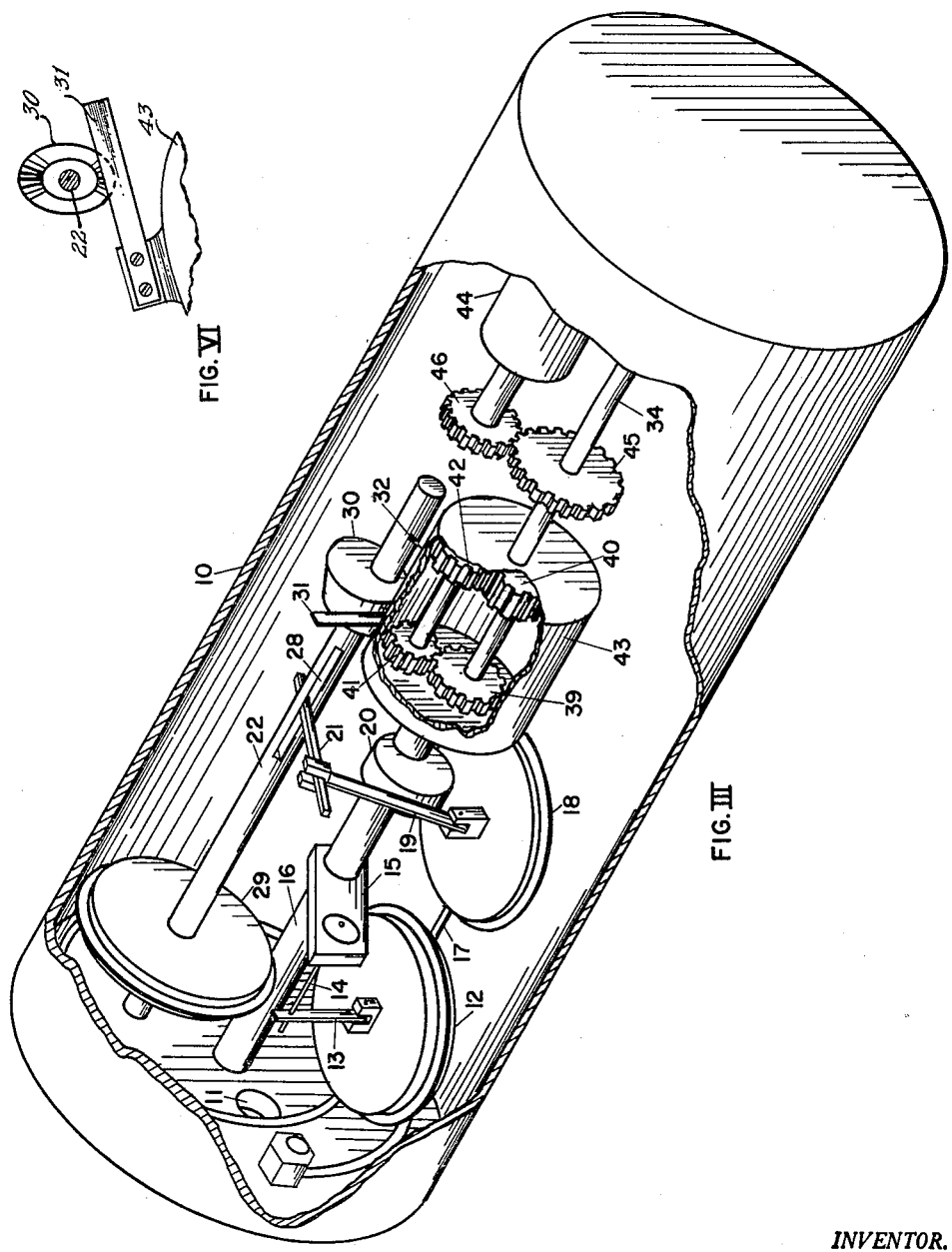
INVENTOR.
CARL E. JOHANSON
BY *Grover G. Frater*
ATTORNEY

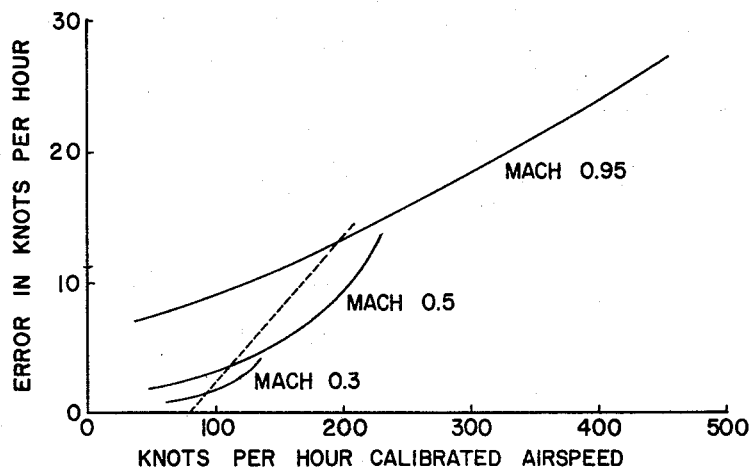
FIG. IV
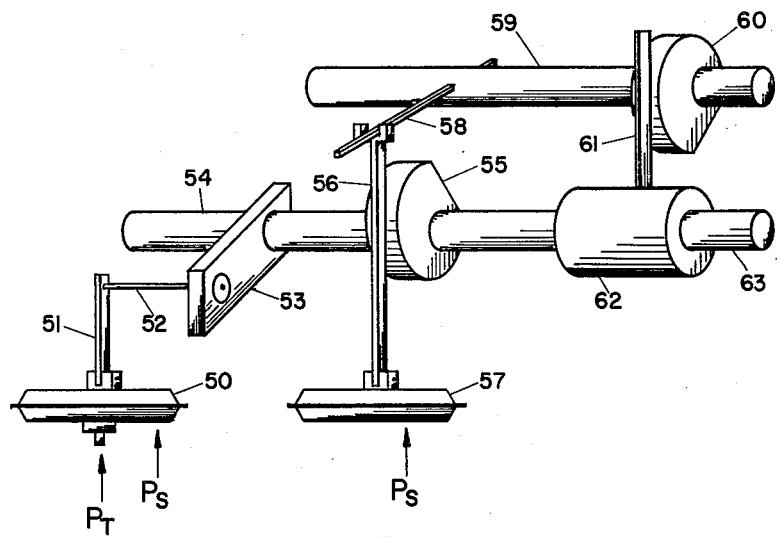
FIG V

United States Patent Office 3,154,944
Patented Nov. 3, 1964

3,154,944
SENSING FLIGHT CONDITIONS
Carl E. Johanson, Davenport, Iowa, assignor to The Bendix Corporation, a corporation of Delaware
Filed Apr. 15, 1960, Ser. No. 22,568
6 Claims. (Cl. 73—182)

This invention relates to improvements in sensing flight conditions. It relates particularly to improved methods and means for determining flight conditions, such as altitude, rate of climb and descent, and airspeed, which vary with altitude pressure.

The invention is made necessary because it has not been possible to measure altitude pressure accurately in a moving craft. Conventionally, altitude pressure is sensed through a static tube which opens at the exterior of the craft. Pressure in the tube varies with changes in the speed and direction of the air past the tube opening, the latter being a function primarily of the configuration of the craft. Practically, in every aerospace vehicle and missile, the ratio of measured altitude pressure to actual altitude pressure varies as a complex function of Mach number.

The error which results in conventional instrumentation is intolerable in a number of situations. Special instruments have been developed. However, they are costly and complex.

Accordingly, an object of the invention is to provide relatively low cost altitude pressure sensitive flight condition sensors having improved accuracy.

It is an advantage of the invention that it can be practiced by the use of electro-mechanical apparatus and signals or by mechanical apparatus and signals, especially in connection with the latter, it is an object of the invention to enable the realization of substantially increased accuracy, or very high accuracy, either one, by the addition of a minimum number of elements, whereby increased cost is small compared to the increase in accuracy.

A further object is to provide improved altitude, rate of climb, and airspeed sensors or instruments.

Other objects and advantages of the invention will hereinafter be apparent.

In the drawings:

FIG. I is a graph illustrating the error in altitude pressure as a function of Mach number measured in a representative aircraft;

FIG. II is a graph showing the error in pressure altitude at various values of actual pressure altitude and indicated Mach number occurring in an uncompensated altimeter in view of the error function described by FIG. I;

FIG. III is a schematic showing of an altitude sensor embodying the invention;

FIG. IV is a graph showing the error in calibrated airspeed at various indicated Mach numbers occurring in uncompensated airspeed indicators in view of the error function described by FIG. I;

FIG. V is a schematic showing of an airspeed sensor embodying the invention and

FIG. VI is a detailed drawing showing the relationship between the cam, cam follower lever, and mechanical differential mechanism.

It is to be understood that various modifications may be made in the embodiments of the invention illustrated in the drawing and that other embodiments are possible without departing from the invention or the scope of the appended claims.

FIG. I shows the curve of indicated altitude pressure to actual altitude pressure ratio variations with Mach number for one type of aircraft in current use. It is found in wind tunnel experiments and actual flight tests. The curves for certain other existing aircraft and missiles have a different shape. The application of the invention is not limited to this one curve or craft but it is applicable to all of them.

The difficulty presented by an error variation of this kind can be appreciated by examination of the relation between various flight conditions and altitude pressure. Where:

$T$=absolute temperature of ambient air
$Hp$=actual pressure altitude
$Vc$=actual calibrated airspeed
$Vci$=indicated calibrated airspeed
$M$=actual Mach number
$Pt$=actual total pressure (dynamic or differential plus altitude pressure)
$Ps$=actual altitude pressures or actual static pressure
$Psi$=indicated altitude pressure or indicated static pressure
$K$=sea level pressure
$t$=time Equation I  $\quad Hp = 221 T \, \mathrm{Log}_{10} \dfrac{K}{Ps}$ II $\quad Vc = 661 \left[ 5\left(\dfrac{Pt-Ps}{K}+1\right)^{2/7} - 1 \right]^{1/2}$ (Subsonic)

III $\quad \dfrac{Pt-Ps}{K} = 166.92 \left[ \dfrac{\left(\dfrac{Vc}{661}\right)^7}{\left[7\left(\dfrac{Vc}{661}\right)^2 - 1\right]^{5/2}} \right] - 1$ (Supersonic)

IV $\quad \dfrac{Pt}{Ps} = (1 + 0.2 M^2)^{3.5}$ (Subsonic)

V $\quad \dfrac{Pt}{Ps} = \dfrac{167 M^7}{(7M^2 - 1)^{2.5}}$ (Supersonic)

VI $\quad$ Rate of Climb (or Descent) $= \dfrac{dHp}{dt}$

Thus the value of each of the flight conditions, altitude, airspeed, and rate of climb, varies with altitude pressure and measured altitude pressure is erroneous as a function of Mach number. However, Mach number is itself a function of altitude pressure. As a consequence of this relation, accurate calculation of flight condition is difficult and has previously required complex apparatus to accomplish.

The invention makes possible an accurate calculation of the flight condition over the range of practical flight conditions. To illustrate, the magnitude of error arising in conventional altimeters can be demonstrated by drawing graphs, one for each of several values of Mach number, of the magnitude of error without the invention against altitude.

FIG. II illustrates the error in feet in the output signal of a conventional altitude sensor installed in the craft for which FIG. I is applicable.

FIG. II is readily found from FIG. I and tables of altitude for various values of altitude pressure such as those found in "Tables and Data for Computing Airspeed, Altitudes, and Mach Numbers Based on the WADC 1952 Model Atmosphere," Volume I, prepared by Battelle Memorial Institute, Columbus, Ohio, 1953. From these tables, $Ps$ has the value of 13.750 inches Hg at 20,000 feet. At Mach 0.9 FIG. I shows the ratio $Psi/Ps$ to equal 1.045. Then $Psi=1.045\times 13.750=14.369$. This, the table shows, is the value of $Ps$ at 18,940 feet whereby the error in measured altitude incident to calculation based on $Psi$ rather than $Ps$ is 20,000 less 18,940 or 1,060 feet. Thus the determination of one point on FIG. II corresponding to 20,000 feet at Mach 0.9 is illustrated. This procedure is repeated for various combinations of altitude and Mach number until enough points are plotted to draw FIG. II with desired accuracy.

Error in FIG. II, for the craft to which FIG. I is applicable, increases with indicated Mach number up to Mach 0.95. As Mach number is increased above this value, the error at any altitude decreases and, as Mach number is further increased, the error again increases. However, the invention can be understood by illustrating the error at Mach numbers less than one and this has been done to avoid unnecessary complication of the graph.

FIG. II shows error plotted against actual pressure altitude. Since indicated pressure altitude is equal to actual pressure altitude minus error, curves of error vs. indicated pressure altitude at various indicated Mach numbers can be drawn. These variables, indicated pressure altitude and indicated Mach number, can be readily determined. Accordingly, it is possible to provide very accurate compensated instruments without need to find actual Mach number.

FIG. III shows an altitude sensor based on these considerations. In it, means are included to provide a signal proportional to indicated pressure altitude. A second means provides a signal proportional to indicated Mach number. A third means responsive to indicated altitude pressure and indicated Mach number provides a signal whose magnitude corresponds, at any value of indicated Mach number and indicated pressure altitude, to the error defined in FIG. II. Means responsive to said error signal corrects the indicated pressure altitude signal whereby a signal proportional to actual altitude pressure results.

The instrument in FIG. III is housed in a case 10 whose interior is subjected to indicated altitude pressure communicated thereto through opening 11 by a static tube, not shown, and it is assumed that the relation between indicated altitude pressure and actual altitude pressure is described in FIG. I. The means for providing a signal proportional to indicated pressure altitude comprises a conventional altimeter mechanism including an aneroid capsule 12 and a linkage including a link 13, a bi-metallic element 14, and an arm 15 which are connected between aneroid 12 and an indicated altitude shaft 16 which solve Equation I such that the angular rotational position of shaft 16 corresponds to indicated pressure altitude.

At this point it should be explained that; consistent with standard aircraft instrument practice, the calculation is based on the assumption that temperature T has a fixed value at each altitude.

The means for providing a signal proportional to indicated Mach number may, as shown, comprise a conventional differential pressure capsule 18 whose interior is subjected to total pressure sensed in the pitot tube, not shown, and to which it is connected by conduit 17, and whose exterior is subjected to indicated altitude pressure within case 10. Accordingly, follower link 19, which is fastened to the differential pressure capsule 18, moves up and down in FIG. III as a function of differential pressure. Follower link 19 bears against and follows a cam 20 which is fixed to and is rotatable with indicated altitude shaft 16.

Cam 20 is cut to modify the motion of follower link 19 whereby the angular movement of lever 21, which bears against the upper end of follower link 19, is determined by the degree of expansion of differential pressure capsule 18 and the rotational position of indicated pressure altitude shaft 16. Follower link 19, cam 20, and lever 21 are arranged such that rotation of shaft 22 to which lever 21 is fixed, is proportional to indicated Mach number. More specifically, cam 20 is cut to move link 19 in proportion to indicated altitude pressure and thus serves the function of the aneroid capsule in a conventional Machmeter. Except for this difference, the elements 18 through 22 will be recognized as comprising a conventional indicated Mach sensor.

The end of lever 21 is fitted in a slot 28 formed in shaft 22 such that the shaft rotates in correspondence with the rotation of lever 21 but so that shaft 22 may be moved back and forth along its axis by a rotatably mounted aneroid capsule 29. This capsule, being subjected to indicated altitude pressure within case 10 expands and contracts such that the position of shaft 22 in the direction of its axis corresponds to indicated altitude pressure. A three dimensional cam 30 is fixed on shaft 22 and is arranged to actuate cam follower lever 31 which, in turn, is fixed to a mechanical differential mechanism 32 to be described later. Follower lever 31 is movable in a plane normal to the axis of shaft 22 but is not movable in the direction of the axis of shaft 22.

The rotational position of cam 30 corresponds to indicated Mach number and its position in the direction of the axis of shaft 22 corresponds to indicated altitude pressure. The cam is shaped so that for any combination of these values its camming distance to the point of engagement with lever 31 is proportional to the magnitude of error described for such values by FIG. II.

The differential mechanism 32 is arranged such that the rotational position of output shaft 34 is proportional to the algebraic sum of the rotational position of indicated altitude pressure shaft 16 and the degree of rotation of lever 31 effected by cam 30. Thus a signal, the rotational position of shaft 34, has been provided which corresponds to actual pressure altitude in the case where indicated altitude pressure was erroneous as a function of Mach number without the need for calculating actual Mach number.

Error is plotted against actual pressure altitude in FIG. II whereas shaft 22 and cam 30 are moved as a function of indicated altitude pressure. Accordingly, cam 30 is cut so that the error values are subtracted from actual altitude to determine the indicated altitude at which correction of such error values is to be accomplished.

A variety of known means are available to add an appropriate correction to the position of shaft 16 or to multiply the position of shaft 16 by a factor which will provide the same result, the amount added or the multiplication factor being determined by the longitudinal and rotational position of shaft 22.

The embodiment selected for illustration employs the mechanical differential or adder 32 of conventional form comprising a gear 39 and a smaller gear 40, which are independently rotatable on a common axis, and a connecting gear set comprising a small gear 41 meshed with gear 39 and a larger gear 42 meshed with gear 40. Gears 41 and 42 are mounted on a common shaft which is held parallel to but offset from the axis of gears 39 and 40, and which common shaft is mounted in a housing 43. Housing 43 is independently rotatable on the axis of gears 39 and 40. Upon rotation of the housing 43, gear 41 is rotated over gear 39 whereby its shaft and gear 42 rotate to effect rotation of output gear 40. Rotation of gear 39, which is fixed to shaft 16 will also result in rotation of gear 40 and the output shaft 34 to which gear 40 is fixed. Thus the rotational position of output shaft 34 is proportional to the sum of the rotational positions of shaft 16 and housing 43.

Since rate of climb or descent is simply rate of change in altitude, the altitude sensor illustrated in FIG. III can be converted to a compensated climb indicator by the addition of means for measuring the rate of rotation of output shaft 34. To this end a conventional rate generator 44 has been included in FIG. III. The rotor of the generator 44 is connected by gears 45 and 46 to the shaft and an electrical signal, whose magnitude indicates rate of climb or descent and whose phase indicates climb or descent, appears at terminals, not shown, of the fixed stator of the generator 44. Thus the instrument is both a compensated altimeter and a compensated climb rate sensor, the altitude signal appearing as rotational position of shaft 34 and the climb signal appearing as an electrical voltage at the output terminals of the rate generator.

Complete correction of indicated altitude requires a different correction at each altitude for each Mach number. However, it is observed that in an instrument to which FIG. II is applicable, the change in error at Mach 0.3 is only a few feet as altitude is changed from zero to 80,000 feet. Even at Mach 0.8 the change in error is only 100 feet as altitude is increased from 20,000 to 80,000 feet since error changes from 610 feet to 510 feet. If a constant correction of 560 feet is added to indicated altitude when Mach number is 0.8, then in the range from 20,000 feet to 80,000 feet the maximum error is only 50 feet. Thus the error can be reduced by more than ninety percent by making only one correction at each Mach number if it is assumed that faster flight will be limited to higher altitude range and this assumption can be made for most vehicles and missiles. The correction to be applied at each Mach number could be selected as the average error in the altitude range at which flight is probable at that Mach number.

Of course, FIG. II is derived from FIG. I which shows ratios of indicated to actual altitude pressure that are much larger than the ratios encountered in many other aerospace vehicles. Accordingly, the degree of change in error with altitude at each Mach number will be substantially less whereby provision of a fixed correction at each Mach number may provide not only a satisfactory degree of accuracy but, indeed, a very high degree of accuracy.

In such an instrument, aneroid 29 would be omitted and cam 30 would be a simple two-dimensional cam whose camming distance was arranged such that lever 31 was rotated, at any value of indicated Mach number, by an amount proportional to the average error, or any arbitrarily selected value of error, at that indicated Mach number.

The sensor illustrated in FIG. V employs such a two dimensional cam. However, it is arranged to sense indicated airspeed rather than pressure altitude.

Referring to FIG. IV, there is shown the error in knots per hour in a conventional calibrated airspeed indicator carried by a craft in which the ratio of indicated to actual altitude pressure varies as shown in FIG. I. It was plotted from information tabulated in the volume previously identified. Tabulated data shows that actual calibrated airspeed at Mach 0.5 at 20,000 feet of altitude is 230 knots per hour and differential pressure is 2.6133 inches of mercury. Altitude pressure is 13.7500 inches of mercury at 20,000 feet. Accordingly, total pressure is 16.3633 inches of mercury. FIG. I shows that the ratio of indicated to actual altitude pressure is 1.045 at Mach 0.5 so the value of indicated altitude pressure is 1.045×13.7500 or 13.8875 whereby indicated differential pressure is 16.3633 less 13.8875 or 2.4758. The tables show this to correspond to 215 knots per hour or 15 knots per hour less than actual airspeed. By such calculations, made at various combinations of altitude and Mach number, FIG. IV is developed.

The invention is applicable, as will be obvious, to sensing true airspeed, equivalent airspeed, and calibrated airspeed. A calibrated airspeed indicator is one that solves Equations II and III. Indicated airspeed is the value of airspeed indicated by a calibrated airspeed indicator. It, indicated airspeed, equals calibrated airspeed in an errorless sensor. Because errorless sensors are seldom found in practice, calibrated airspeed sensors are often called indicated airspeed sensors. In the following description of a calibrated airspeed sensor, "indicated airspeed" and "indicated calibrated airspeed" both mean uncorrected calibrated airspeed. "Actual airspeed" means corrected calibrated airspeed.

Returning to FIG. V, although it appears to be, and is, similar to the sensor shown in FIG. III, this device senses calibrated airspeed because its aneroid and differential pressure capsule have been interchanged and its linkage lengths modified to solve Equations II and III. Differential pressure capsule 50, link 51, bi-metal 52, arm 53, and airspeed shaft 54 comprise a conventional calibrated airspeed mechanism whereby the rotation position of shaft 54 is proportional to indicated calibrated airspeed measured in terms of indicated differential pressure. Shaft 54 carries a cam 55 which is cut to move its follower 56 in accordance with the indicated differential pressure. Follower 56 is also moved by aneroid 57 in accordance with indicated altitude pressure, it being understood that the mechanism of FIG. V is encased in an enclosure, not shown, whose interior is connected to a static tube and subjected to an indicated altitude pressure which is erroneous as described in FIG. I.

Motion of follower 56 is transmitted to a lever 58 which bears against the upper end of follower 56 and which terminates in a connection on indicated Mach number shaft 59. Knowing that the camming distance in cam 55 varies with differential pressure, instrument workers will recognize the elements 55 through 59 as a Machmeter in which the rotational position of shaft 59 corresponds to indicated Mach number. Shaft 59 carries a cam 60 which cooperates with a cam follower lever 61 attached to a mechanical differential mechanism 62. The differential 62 and its follower 61 are like the differential 32 and follower 31 of FIG. III and operate in like fashion, so that the rotational position of output shaft 63 corresponds to the sum of the rotational position of airspeed shaft 54 and the degree in which follower 61 is rotated by cam 60.

Cam 60 is cut on the basis of information developed in FIG. IV. At each value of indicated Mach number, hence at each angular position, its camming distance corresponds to a selected value of error in calibrated airspeed. Cam 60 is cut to actuate cam follower 61 by an amount which corresponds to the error, for any value of indicated Mach number which is defined in FIG. IV by the intersection of the dashed line and the error curve for that indicated Mach number. The direction of the dashed line is selected arbitrarily such that the percentage of error in actual airspeed will be substantially constant for flight within a selected range of actual airspeeds and Mach number, that is within a selected range of speeds and altitudes.

It will be apparent that the sensor shown in FIG. V may be modified to provide a completely corrected instrument by the addition of a differential pressure capsule to move shaft 59 in the direction of its axis and by substitution for cam 60 of a three-dimensional cam which is cut at each rotational position to move follower 61 in accordance with the error described in FIG. IV as the cam is moved by the differential pressure capsule in accordance with indicated airspeed.

While the forms of the instrument shown are advantageously employed, it will be obvious in FIG. III that expansion and contraction of aneroid capsule 12 could be employed to move the indicated Mach shaft 22 back and forth along its axis thus to eliminate the need for the additional aneroid capsule 29. Similarly, the differential pressure capsule 50 in FIG. V could be employed through appropriate mechanism to move indicated Mach number shaft 59 back and forth along its axis. Furthermore, cam 20 in FIG. III could be replaced with an aneroid capsule, it being necessary only to provide a signal proportional to indicated Mach number. This is true as well in FIG. V where cam 55 could be replaced with a differential pressure capsule. It is observed that indicated airspeed, indicated Mach number, and indicated altitude signals may be provided by conventional instrumentation with the corrections being accomplished by a minimum number of additional elements.

While shown and described in terms of mechanical elements, the invention is applicable as well to instruments employing electro-mechanical elements, it being required only to provide a signal proportional to the magnitude of the indicated value of the variable to be sensed and the indicated value of the flight condition to which error is proportional and to correct the signal representing indicated value of the desired flight condition by the amount of the error which corresponds to the indicated value of the flight condition to which error is related.

In the case of the Mach vs. error in altitude pressure function in the static pressure sensors of certain aircraft, the function is such that the cams of the compensated instrument corresponding to the cams 20, 30, 55, and 60, would have large changes in camming distance over a small angle of rotation. This is undesirable for several reasons well known to instrument makers and designers, but these artisans also know how to overcome such problems by modifying the cam, its driving mechanism, and its follower mechanism so that the individual elements meet the test of good design without any change in the end result. Such modified arrangements, then, are equivalent to the arrangements described.

I claim:

1. An instrument for providing a signal representing the state of a flight condition which can be measured in terms of altitude pressure in the circumstance in which the ratio of indicated altitude pressure to actual altitude pressure has a predetermined relation to indicated Mach number other than one, which comprises first means for producing a first signal proportional in value to indicated altitude pressure, second means for producing a second signal proportional in value to the differential between measured dynamic pressure and indicated altitude pressure, means responsive to said first and second signals for producing a third signal which varies as a function of Mach number, means responsive to altitude pressure for producing a fourth signal, means responsive to the sum of said first signal and a composite of said third and fourth signals for producing a compensated flight condition signal.

2. An altitude sensor for use in the circumstance in which the ratio of indicated altitude pressure to actual altitude pressure has a predetermined relation to indicated Mach number other than one, which comprises an indicated altitude shaft; means sensitive to measured altitude pressure for rotating said shaft to a position corresponding to indicated altitude pressure, a Mach function shaft; means sensitive to indicated differential pressure and the rotational position of said indicated altitude shaft for rotating said Mach function shaft to a position corresponding to a predetermined function of Mach number; a corrected pressure altitude shaft; and means sensitive to the position of said indicated altitude shaft and the position of said Mach function shaft for rotating said corrected pressure altitude shaft to a position proportionately corresponding, at each position of said Mach function shaft, to the sum of the position of said indicated altitude shaft plus the difference between the rotational position of said indicated altitude shaft at a selected pressure altitude and the position the shaft would have at that altitude pressure if said means sensitive to indicated altitude pressure was subjected to actual altitude pressure.

3. An instrument for determining actual pressure altitude from differential pressure and an indicated altitude pressure which differs from actual altitude pressure as a function of Mach number, comprising means for translating said indicated altitude pressure into a first mechanical displacement whose magnitude varies with said indicated pressure substantially as actual pressure altitude varies with actual altitude pressure, means responsive to the magnitudes of said differential pressure and said indicated altitude pressure for producing a second mechanical displacement which varies with their magnitudes as Mach number varies with actual altitude pressure and differential pressure, means for modifying said second mechanical displacement in accordance with a predetermined function of indicated Mach number to provide a corrective displacement proportional to the amount by which said first displacement varies from the value it would have if indicated altitude pressure was actual altitude pressure, and means for combining said first and corrective translations into a translation simulating actual altitude.

4. An instrument for sensing actual pressure altitude in response to differential pressure and an indicated altitude pressure which differs from actual altitude pressure as a function of Mach number, comprising a first rotatable member, means including an expansible capsule subjected to said indicated altitude pressure for rotating said first member to an angular position corresponding to indicated pressure altitude, a second rotatable member, means responsive to the angular position of said first member and differential pressure for rotating said second element to an angular position corresponding to indicated Mach number, a third rotatable element, a cam and follower responsive to the angular position of said second member and to indicated altitude pressure for rotating said third member to a position having correspondence with the position of said second member corresponding to the error in the angular position of said first element at various combinations of indicated Mach number and indicated altitude pressure, a fourth rotatable element, and means for rotating said fourth element to a position representing the sum of the rotational positions of said first and third elements.

5. An instrument for sensing actual pressure altitude in response to dynamic pressure and an indicated altitude pressure which differs from actual altitude pressure as a function of Mach number, comprising an adder of mechanical displacements including two displaceable input members and an output member displaced proportionally to the combined displacement of said input members, means sensitive to indicated altitude pressure for displacing one of said input members in a degree corresponding to indicated pressure altitude, an element displaceable as a Mach function of differential pressure and means responsive to differential pressure for so displacing said element, and means for displacing said other input member of said adder as a function of the combined displacements of said one input member and said element.

6. The invention defined in claim 5 including means for measuring the rate of displacement of said output member.

References Cited in the file of this patent

UNITED STATES PATENTS

| | | |
|---|---|---|
| 2,598,681 | Garbarini et al. | June 3, 1952 |
| 2,751,786 | Coulbourn et al. | June 26, 1956 |
| 2,944,736 | Elms et al. | July 12, 1960 |